(12) United States Patent
Lee et al.

(10) Patent No.: US 6,311,181 B1
(45) Date of Patent: Oct. 30, 2001

(54) MULTI-DIMENSIONAL SELECTIVITY ESTIMATION METHOD USING COMPRESSED HISTOGRAM INFORMATION

(75) Inventors: Ju-Hong Lee; Deok-Hwan Kim; Chin-Wan Chung, all of Seoul (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 09/273,131

(22) Filed: Mar. 19, 1999

(30) Foreign Application Priority Data

Mar. 5, 1999 (KR) .................................................... 99-7228

(51) Int. Cl.[7] ........................................................ G06F 7/00
(52) U.S. Cl. ........................................................ 707/5; 707/2
(58) Field of Search ........................ 707/2, 5; 348/403.1; 375/240.18; 382/248

(56) References Cited

PUBLICATIONS

"Selectivity Estimation Without the Attribute Value Independence Assumption" By V. Poosala et al., VLDB Conference 1997.

"Improved Histograms for Selectivity Estimation of Range Predicates", By V. Poosala et al., SIGMOD '96, Jun. 1996, pp. 294–305.

*Primary Examiner*—Hosain T. Alam
*Assistant Examiner*—Tann Nguyen
(74) *Attorney, Agent, or Firm*—Bachman & LaPointe, P.C.

(57) ABSTRACT

Disclosed is a multi-dimensional selectivity estimation method using compressed histogram information which the database query optimizer in a database management system uses to find the most efficient execution plan among all possible plans. The method includes the several steps to generate a large number of small-sized multi-dimensional histogram buckets, sampling DCT coefficients which have high values with high probability, compressing information from the multi-dimensional histogram buckets using a multi-dimensional discrete cosine transform(DCT) and storing compressed information, and estimating the query selectivity by using compressed and stored histogram information as the statistics.

6 Claims, 10 Drawing Sheets

| Dimension | #DCT=50 | #DCT=100 | #DCT=200 |
|---|---|---|---|
| 3 | 300μsec | 600μsec | 1.2msec |
| 6 | 600μsec | 1.2msec | 2.4msec |
| 9 | 900μsec | 1.8msec | 3.6msec |
FIG. 6
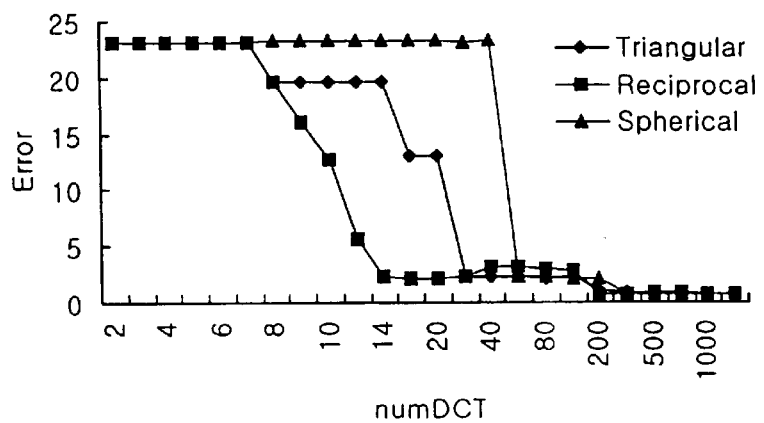
FIG. 7
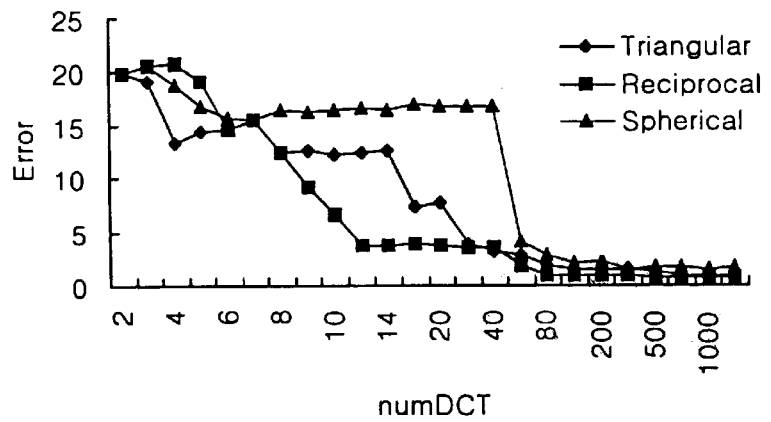
FIG. 8

MULTI-DIMENSIONAL SELECTIVITY ESTIMATION METHOD USING COMPRESSED HISTOGRAM INFORMATION

BACKGROUND OF THE INVENTION

1. Field of the Invention

The present invention relates to an estimation method of the query selectivity which the database query optimizer in a database management system uses to find the most efficient execution plan among all possible plans, and more particularly, to a multi-dimensional selectivity estimation method using a compressed histogram information in which the compressed histogram information on multi-dimensional data distribution is stored by means of a schema manager and is used for the selectivity estimation, so that because of small-sized histogram buckets, a low error rate can be achieved, and because of compression of the information of a large number of histogram buckets, a low storage overhead can be also achieved.

2. Discussion of Related Art

Generally, in the database management system as shown in FIG. 1, the database query optimizer requires the estimation of the query selectivity to find the most efficient execution plan. There are two classes in selectivity estimation problems according to the dimensionality. One is the 1-dimensional selectivity estimation and the other is the multidimensional selectivity estimation. The 1-dimensional selectivity estimation technique is applied in case of a query with a single attribute or with multiple attributes independently from each other, for which a histogram method is practically used.

Data distribution is divided into small-sized non-overlapping buckets, in order to approximate and store the information of the data distribution, and statistics data for the interval of the buckets and the number of data on the bucket is called a histogram. The selectivity estimation using a histogram is as follows: First, all buckets, overlapping with the query are selected. The statistics in each bucket is used to compute the number of data that satisfy the query. The numbers of the satisfied data from each bucket are summed up to get the final estimation result. The histogram method is again classified into various methods according to how to partition the data distribution into buckets: the Equi-width, the Equi-depth, the V-optimal method, etc.

In the Equi-width, the widths of the buckets are equal, and the number of data in each bucket approximates the data distribution. In the Equi-depth, each bucket has the same number of data, so the widths of the buckets are different. When compared with the Equi-width method, the Equi-depth method is adequate in case of a high degree of skewness of data. In the V-optimal method, the sum of weighted variances of buckets is minimized. The V-optimal method has been shown to be the most accurate histogram method among the above methods [reference: Y. Ioannidis, V. Poosala. Balancing Optimality and Practicality for Query Result Size Estimation, ACM SIGMOD Conference 1995].

For queries referencing multiple attributes from the same relation, a multi-dimensional selectivity estimation technique is needed when the attributes are dependent each other because the selectivity is determined by the joint data distribution of the attributes.

There are proposed various methods for the multi-dimensional selectivity estimation technique as follows:

First, there is a selectivity estimation method using a correlation fractal dimension that is used for queries in a geographic information system[reference: A. Belussi, C. Faloutsos. Estimating the Selectivity of Spatial Queries Using 'Correlation' Fractal Dimension. VLDB Conference 1995]. However, the selectivity estimation using the correlation fractal dimension can compute only the average of the estimation results for the same shape and size queries and cannot compute the estimation result for the query in a specified position. Additionally, the selectivity estimation can be practically used in two and three dimensions.

Secondly, there is an estimation method that uses a multi-dimensional file organization called the multilevel grid file(MLGF)[Reference: K. Y. Whang, S. W. Kim, G. Wiederhold. Dynamic Maintenance of Data Distribution for Selectivity Estimation, VLDB Journal Vol.3, No. 1, p29–51, 1994]. The MLGF partitions the multi-dimensional data space into several disjoint nodes, called grids, that act as histogram buckets. A new field, count, is added to each grid node for saving the number of data in the grid. The selectivity is estimated by accessing grid nodes overlapping with a query. This method supports dynamic data updates because MLGF itself is a dynamic access method, thus to reflect histogram information for the selectivity estimation immediately when data are updated. Therefore, in an environment where data is updated frequently, the overhead for periodical reconstructions of the histogram information can be eliminated. However, the MLGF suffers from the dimensionality curse that means severe performance degradation in high dimensions [Reference: S. Berchtold, C. Bohm, H. Kriegel. The Pyramid Technique: Towards Breaking the Curse of Dimensionality. ACM SIGMOD Conference 1998]. So, the method can not be applied in dimensions higher than three.

Third, there is proposed a Singular Value Decomposition (SVD) method. The SVD method decompose the joint data distribution matrix J into three matrices U, D, and V that satisfy $J=UDV^T$. Large magnitude diagonal entries of the diagonal matrix D are selected together with their pairs, left singular vectors from U and right singular vectors from V. These singular vectors are partitioned using any one-dimensional histogram method. There are many efficient SVD algorithms, but the SVD method can be used only in two dimension.

Fourth, there is proposed a Hilbert Numbering method. The Hilbert numbering method converts the multi-dimensional joint data distribution into the 1-dimensional one and partitions it into several disjoint histogram buckets using any one-dimensional histogram method. The buckets made by this method may not be rectangles. Therefore, it is difficult to find the buckets that overlap with a query. The estimates may be inaccurate because it does not preserve the multi-dimensional proximity in 1-dimension.

Fifth, there are proposed the PHASED method and the MHIST method. The PHASED method partitions an n-dimensional space along one dimension chosen arbitrarily by the Equi-depth histogram method, and repeats this until all dimensions are partitioned. The MHIST method is an improvement to the PHASED method. It selects the most important dimension in each state and partitions it. From the V-optimal point of view as an applied partitioning method in MHIST, the dimension that has the largest variance is the most important. The experiments showed that the MHIST technique is the best among a variety of multi-dimensional histogram techniques [Reference: V. Poosala, Y. E. Loannidis. Selectivity Estimation Without the Attribute Value Independence Assumption. VLDB Conference 1997]. However, even though it produces low error rates in 2-dimensional cases, it has relatively high error rates in the 3 or more dimensional space.

Meanwhile, in order to achieve low error rates in the histogram method, the size of histogram buckets must be small. As the dimension increases, however, the number of histogram buckets that can achieve low error rates increases explosively. This is because the number of histogram buckets is in inverse proportion to the dimension'th power to the normalized one-dimensional length of a partitioned multi-dimensional bucket as expressed by an equation below.

$$\text{the number of buckets} \propto \frac{1}{d^{dim}} \quad (1)$$

Where, the condition 0<d<1 is satisfied, and d is the 1-dimensional length of a bucket.

It causes a severe storage overheads problem, which results in failure in sufficient small-sized buckets so as to have low error rates. Therefore, it is impossible to maintain a reasonably small storage with low error rates in high dimensions. Also it is difficult to partition a multi-dimensional space into disjoint histogram buckets efficiently so that the error rates are kept small. From a practical point of view, these methods cannot be used in dimensions higher than three.

Another problem is that all methods except the MLGF method cannot reflect dynamic data updates immediately to the statistics for the selectivity estimation. This leads to an additional overhead such as the periodical reconstruction of statistics for the estimation.

SUMMARY OF THE INVENTION

Accordingly, the present invention is directed to a multi-dimensional selectivity estimation method using a compressed histogram information that substantially obviates one or more of the problems due to limitations and disadvantages of the related arts.

An object of the invention is to provide an estimation method of the query selectivity which the database query optimizer in a database management system uses to find the most efficient execution plan among all possible plans, and more particularly, to provide a multi-dimensional selectivity estimation method using compressed histogram information in which the compressed histogram information on multi-dimensional data distribution is stored by means of a schema manager and is used for the selectivity estimation, so that because of small-sized histogram buckets, a low error rate can be achieved, and because of compression of the information of a large number of histogram buckets, a low storage overhead can be also achieved, to be thereby applied to design and embody the query optimizer of text database or multimedia database.

To accomplish this and other objects of the present invention, a multi-dimensional selectivity estimation method using compressed histogram information according to the present invention suggests following solutions:

First, compressed histogram information from a large number of small-sized buckets is maintained using the discrete cosine transform(DCT). This can be achieved from the fact that DCT can compress the information remarkably. DCT has been widely used in the image and signal processing area usually in 2-dimensional domain. Therefore, in the preferred embodiment of the present invention, the DCT is extended to a general n-dimensional domain.

Second, low error rates can be achieved by small-sized buckets.

Third, low storage overheads can be achieved by compressing a large amount of histogram bucket information.

Fourth, this method has the advantage in that it is not necessary to periodically reconstruct statistics for selectivity estimation, because it reflects dynamic data updates into the statistics for the estimation immediately using the linearity of DCT.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description to explain the principles of the drawings.

In the drawings:

FIGS. 2A to 2C are graphs illustrating geometrical zonal sampling in 2-dimensional case, in which FIG. 2A shows a triangular zonal sampling, FIG. 2B a reciprocal zonal sampling, and FIG. 2C a spherical zonal sampling;

FIG. 6 is a table showing the selectivity computation time in Sun Ultra II;

FIG. 7 is a graph showing error rates in case of normal distribution, dimension=6, and one-dimensional partition=10;

FIG. 8 is a graph showing error rates in case of Zipf distribution, dimension=6, and one-dimensional partition=10;

DETAILED DESCRIPTION OF PREFERRED EMBODIMENT

Figure 1:
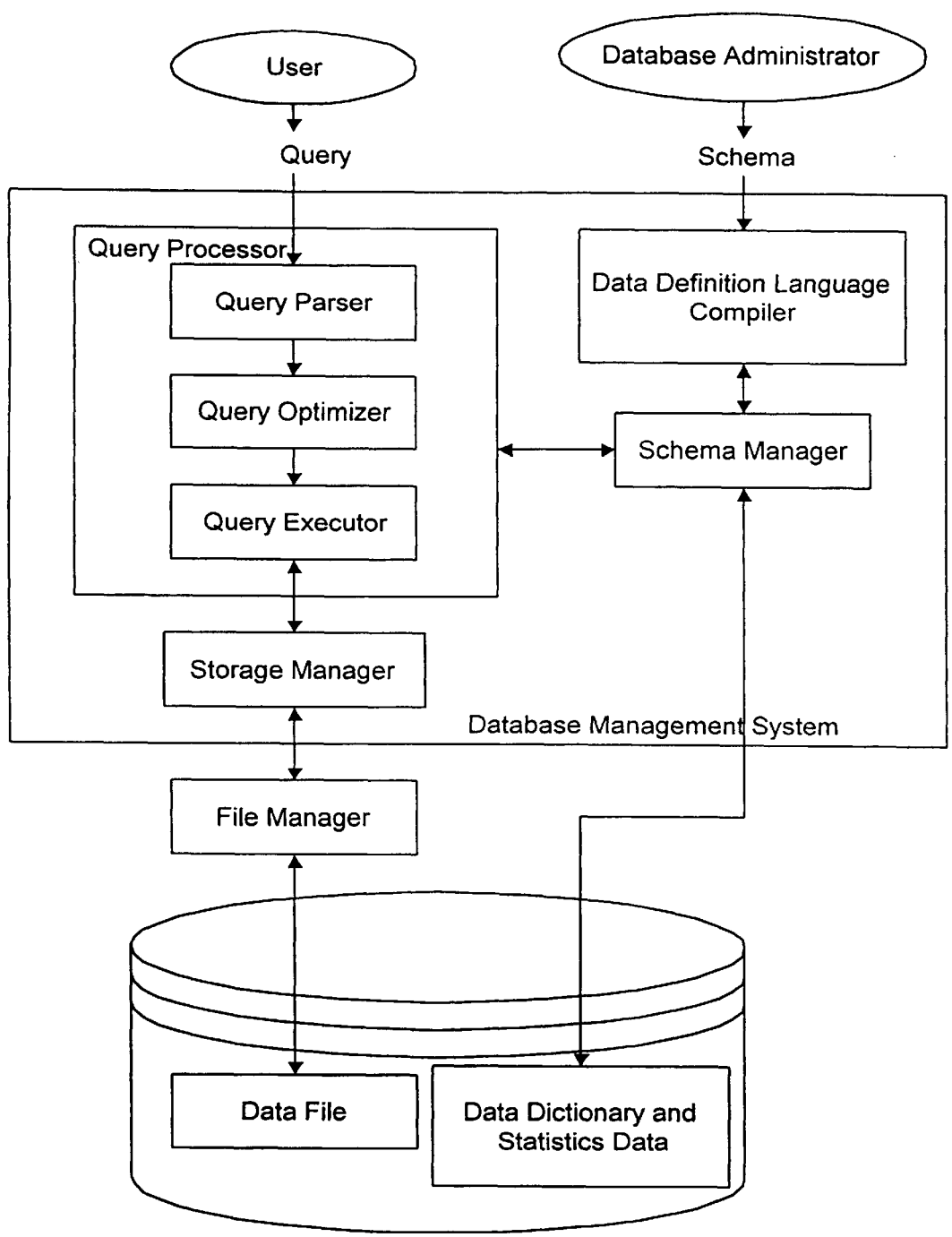
FIG. 1 is a block diagram illustrating a relationship between database management system function modules and a query optimizer.

Reference will now be made in detail to the preferred embodiments of the present invention, examples of which are illustrated in the accompanying drawings.

DCT is used as a compression technique in the present invention. The DCT can reduce the correlation between adjacent transformed coefficients, if data adjacent to each other in the data distribution are highly correlated. That is, if the frequency spectrum of a data distribution is skewed in which the magnitudes of low frequency coefficients are high, while those of high frequency coefficients are low, the high frequency coefficients can be discarded without seriously affecting the original data distribution and only the low frequency coefficients can be used. This is a data compression principle.

The DCT has been widely used in the image and signal processing areas usually in the 2-dimensional domain because it has the power to compress information. Since the multi-dimensional DCT for compressing the histogram information should be used in the present invention, however, a brief description of the definition of the 1-dimensional DCT and the 2-dimensional DCT will be described and then extension of them to the multi-dimensional DCT will be described.

For a series of data $\vec{F}=(f(0), f(1), \ldots, f(N-1))$, DCT coefficients, $\vec{G}=(g(0), g(1), \ldots, g(N-1))$, are defined as follows:

$$g(u) = \sqrt{\frac{2}{N}} k_u \sum_{n=0}^{N-1} f(n) \cos\left(\frac{(2n+1)u\pi}{2N}\right) \qquad (2)$$

where if the condition u=0 is satisfied, $k_u=1/\sqrt{2}$, and if $u \neq 0$, $k_u=1$. And, u=0, ..., N−1.

$\vec{F}=(f(0), f(1), \ldots, f(N-1))$ is recovered by the inverse DCT defined as follows:

$$f(n) = \sqrt{\frac{2}{N}} \sum_{u=0}^{N-1} k_u g(u) \cos\left(\frac{(2n+1)u\pi}{2N}\right) \qquad (3)$$

where n=0, ..., N−1.

1-dimensional DCT was extended to 2-dimensional DCT as follows: Let $[F]_2$ be an M×N matrix representing the 2-dimensional data and $[G]_2$ be the 2-dimensional DCT coefficients of $[F]_2$. Then, the element g(u,v) of $[G]_2$ is given by $$g(u, v) = \sqrt{\frac{2}{M}} k_u \sum_{m=0}^{M-1} \left\{ \sqrt{\frac{2}{N}} k_v \sum_{n=0}^{N-1} f(m,n) \cos\left[\frac{(2n+1)v\pi}{2N}\right] \right\} \cos\left[\frac{(2m+1)u\pi}{2M}\right] \qquad (4)$$

where u=0, ..., M−1 and v=0, ..., N−1.

Its inverse is as follows:

$$f(m, n) = \sqrt{\frac{2}{M}} \sum_{u=0}^{M-1} k_u \left\{ \sqrt{\frac{2}{N}} \sum_{v=0}^{N-1} k_v g(u, v) \cos\left[\frac{(2n+1)v\pi}{2N}\right] \right\} \cos\left[\frac{(2m+1)u\pi}{2M}\right] \qquad (5)$$

Now, the above is generalized to the k-dimensional DCT recursively as follows:

Let $[F]_k$ be $N_1 \times N_2 \times \ldots \times N_k$ k-dimensional data. Let $u(t)=\{u_i|1 \leq i \leq t\}$, $n(t)=\{n_i|1 \leq i \leq t\}$ for $1 \leq i \leq k$, $1 \leq t \leq k$ and $u_i=0, \ldots, n_i-1$, $n_i=0, \ldots, N_i-1$. Let $[G]_k$ be the DCT coefficients of $[F]_k$. G(u(t)), F(u(t)) are defined as follows:

$$G(u(t)) = \sqrt{\frac{2}{N_t}} k_{u_t} \sum_{n_t=0}^{N_t-1} G(u(t-1)) \cos\left(\frac{(2n_t+1)u_t\pi}{2N_t}\right) \qquad (6)$$

$$G(u(1)) = \sqrt{\frac{2}{N_1}} k_{u_1} \sum_{n_1=0}^{N_1-1} f(n_1, \ldots, n_k) \cos\left(\frac{(2n_1+1)u_1\pi}{2N_1}\right) \qquad (7)$$

$$F(n(t)) = \sqrt{\frac{2}{N_t}} \sum_{u_t=0}^{N_t-1} k_{n_t} F(n(t-1)) \cos\left(\frac{(2n_t+1)u_t\pi}{2N_t}\right) \qquad (8)$$

$$F(u(1)) = \sqrt{\frac{2}{N_1}} \sum_{n_1=0}^{N_1-1} k_{n_1} g(u_1, \ldots, u_k) \cos\left(\frac{(2n_1+1)u_1\pi}{2N_1}\right) \qquad (9)$$

Then, k-dimensional DCT coefficients is given by $g(u_1, \ldots, u_k)=G(u(k))$. And the inverse DCT transform is given by $f(u_1, \ldots, u_k)=F(u(k))$.

In the present invention there is proposed a curve-fitting method using DCT. In this method, a uniform grid is used as histogram buckets in a multi-dimensional space. From now, this grid is called a uniform histogram bucket. In case a data distribution is highly correlated, that is, adjacent data have the similar values, DCT makes it possible for a few data items to represent the whole data by compressing information of the data distribution. Also, the original distribution can be restored by the inverse transformation with low error rates. This method solves the problem of the high storage overheads and high error rates in high dimensional spaces, since it uses a large number of small-sized multi-dimensional histogram buckets while compressing information from histogram buckets.

There are various considerations to estimate the multi-dimensional selectivity by using DCT: coefficients sampling, data distribution, dynamic data update, and selectivity computation.

First consideration is related to an efficient sampling method to select low-frequency coefficients that have large values. Second consideration to describe what is the constraint of the data distribution to compress the histogram information efficiently. Third consideration to explain how to support dynamic data updates to reflect it to the statistics immediately. Fourth consideration to describe how to simply calculate the selectivity estimation.

An explanation of a geometric zonal sampling method as an appropriate coefficient sampling method will be discussed hereinafter. The size of the histogram bucket should be maintained small enough to get a low error rate in high dimensionality. Since the number of DCT coefficients transformed is the same as the uniform histogram buckets, however, it increases exponentially as the dimensionality increases. If appropriate coefficients are chosen after all coefficients are computed, it causes a severe computation overhead. Therefore, only the coefficients that are estimated to have large values should be chosen and computed. According to the compression principle of DCT, since the low frequency coefficients have large values, if the data distribution are highly correlated, the low frequency zone is specified geometrically and the transformed coefficients within the specified zone are processed, with the remaining ones set to zero.

Figure 2A:
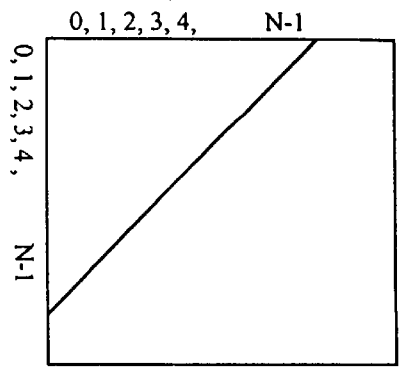
Figure 2B:
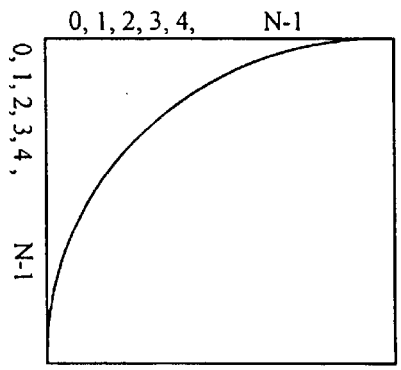
Figure 2C:
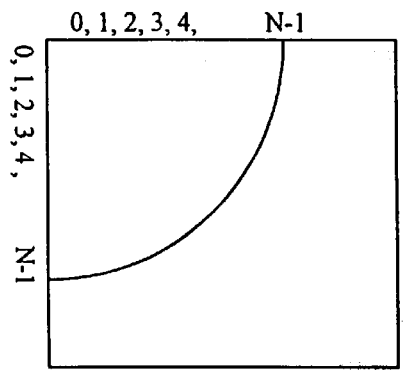

This selection corresponds to low frequency filtering. There are several zonal sampling techniques: The triangular, the reciprocal, and the spherical zonal sampling. FIGS. 2A to 2C show only 2-dimensional cases.

The triangular zonal sampling method is to select the DCT coefficients, $g(u_1, \ldots, u_n)$, such that $$\sum_{i=1}^{n} u_i \leq b \text{ for } u_i = 0, \ldots, N_i = 1.$$

The reciprocal zonal sampling method is to select the DCT coefficients, $g(u_1, \ldots, u_n)$, such that $$\prod_{i=1}^{n} (u_i + 1) \leq b \text{ for } u_i = 0, \ldots, N_i - 1.$$

The spherical zonal sampling method is to select the DCT coefficients, $g(u_1, \ldots, u_n)$, such that $$\sum_{i=1}^{n} u_i^2 \leq b \text{ for } u_i = 0, \ldots, N_i - 1.$$

The considerations on the data distribution are as follows: In order to be able to compress a great number of histogram buckets into a small amount of information with low estimation error rates by using DCT, the data distribution should have high correlation among data items. That is, the frequency spectrum of the distribution should show large values in its low frequency coefficients and small values in its high frequency coefficients [Reference: R. Agrawal, C. Faloutsos, A, Swami, Efficient Similarity Search in Sequence Databases. Foundations of Data Organizations and Algorithms Conference, 1993].

If the data distribution does not follow the above characteristics, for example, data are totally independent of adjacent data, information compression is impossible. However, data in a real data distribution are highly correlated. It is natural for the joint data distribution of multiple attributes from a relation to have clusters in most cases. Actually in the areas like data mining, the techniques to find such clusters are practically used for extracting useful knowledge from a large volume of databases [Reference: S. Guha, R. Rastogi, K. Shim. CURE: An Efficient Clustering Algorithm for Large Databases. ACM SIGMOD Conference 1998].

The clustering effect can also be seen in multimedia databases like images and in spatial databases [Reference: G. Sheikholeslami, W. Chang, A. Zhang. Semantic Clustering and Querying Heterogeneous Features for Visual Data. ACM Multimedia 1998]. The large-sized shapes of a cluster correspond to large-valued low frequency coefficients while small-sized variations in it correspond to small-valued high frequency coefficients. Based on these observations, the number of multi-dimensional histogram buckets can be reduced remarkably. In general, as the skewness of data distribution grow or the number of clusters increases, the number of large-valued high frequency coefficients tends to increase. It means more coefficients are needed to keep low error rates.

If dynamic data updates can not be immediately reflected to the statistics for estimating selectivity in the environment where data are frequently inserted or deleted, the overload for periodical reconstruction of the compressed statistics increases. The proposed method of the present invention can reflect dynamic data updates to the statistics for estimating the selectivity with reasonable overheads. This is enabled because DCT is a linear transform. Its process is as follows: When data is newly inserted, the values of its DCT coefficients are computed and added into existing DCT coefficients. In case of deletion, the values of DCT coefficients of the deleted data are computed and subtracted from existing DCT coefficients. Therefore, data insertions and deletions can be immediately reflected into the statistics for estimating the selectivity by processing only the update data.

As an example for a 2-dimensional case, Let $[F]_2$ be the current uniform histogram buckets and $[G]_2$ be the current DCT coefficients of $[F]_2$. Let $[F']_2$ be some data updates which represents that one data in (0,1) and two data in (1,2) are deleted and two data in (2,0) are newly added. And let $[G']_2$ be DCT coefficients of $[F']_2$. Let $[F'']_2$ be the final uniform histogram buckets and $[G'']_2$ be final DCT coefficients of $[F'']_2$. Then, $[F'']_2=[F]_2+[F']_2$ and $[G'']_2=[G]_2+[G']_2$. That is, if $[G'']_2$ is produced from $[F'']_2$, it takes a long period of time, but if $[G']_2$ is added to $[G]_2$, the $[G'']_2$ can be readily produced.

$$[F]_2 = \begin{pmatrix} 10 & 15 & 13 \\ 14 & 20 & 16 \\ 9 & 13 & 11 \end{pmatrix} \rightarrow DCT \; [G]_2 = \begin{pmatrix} 40.333 & -2.858 & -5.421 \\ 2.041 & -0.500 & -0.289 \\ -6.835 & -0.289 & 1.167 \end{pmatrix}$$

$$[F']_2 = \begin{pmatrix} 0 & -1 & 0 \\ 0 & 0 & -2 \\ 2 & 0 & 0 \end{pmatrix} \rightarrow DCT \; [G']_2 = \begin{pmatrix} -0.333 & 1.633 & 0.471 \\ -1.225 & -1.000 & 0.000 \\ 1.179 & -0.577 & 1.333 \end{pmatrix}$$

$$[F'']_2 = \begin{pmatrix} 10 & 14 & 13 \\ 14 & 20 & 14 \\ 11 & 13 & 11 \end{pmatrix} \rightarrow DCT \; [G'']_2 = \begin{pmatrix} 40.000 & -1.225 & -4.950 \\ 0.816 & -1.500 & -0.289 \\ -5.657 & -0.886 & 2.500 \end{pmatrix}$$

There are two kinds of methods to compute the selectivity of a range query. The first method finds all histogram buckets within the query range using the inverse DCT, and then computes the selectivity in the same manner as the existing histogram methods. The second method computes the selectivity using the integral of the inverse DCT function since the function is a continuous cosine function.

The former method needs the inverse DCT computation for each bucket information while the latter simply computes the selectivity without the computation for each bucket information count since it computes the integral of the inverse DCT function only for the interval of the query range. Since the inverse DCT function naturally supports the continuous interpolation between contiguous histogram buckets, the second method provides accurate results.

The following is the expression of the integral to estimate the selectivity of a range query. First, the 2 dimensional case is described and generalized to the k-dimensional case. Let $q_2$ be a 2-dimensional query. The range of $q_2$ is $a \leq x \leq b$, $c \leq y \leq d$. It is assumed that the data space is normalized as $(0,1)^2$. The x coordinate is divided into N partitions and y coordinate is divided into M partitions. Then i'th positions of x,y ($x_i$ and $y_i$) are as follows:

$$x_i = \frac{2i+1}{2N}, y_i = \frac{2i+1}{2M} \quad (10)$$

Then we can rewrite the expression (5) as follows:

$$f(x, y) = \sqrt{\frac{2}{M}} \sum_{u=0}^{M-1} k_u \left\{ \sqrt{\frac{2}{N}} \sum_{v=0}^{N-1} k_v g(u, v) \cos(xu\pi) \right\} \cos(yu\pi) \quad (11)$$

Selectivity of a query $$q_2 = \int_c^d \int_a^b f(x, y) dx dy \quad (12)$$

$$= \int_c^d \int_a^b \sqrt{\frac{2}{M}} \sum_{u=0}^{M-1} k_u \left\{ \sqrt{\frac{2}{N}} \sum_{v=0}^{N-1} k_v g(u, v) \cos(xu\pi) \right\}$$
$$\cos(yu\pi) dx dy$$

$$= \int_c^d \sqrt{\frac{2}{M}} \sum_{u=0}^{M-1} k_u \left\{ \int_a^b \sqrt{\frac{2}{N}} \sum_{v=0}^{N-1} k_v g(u, v) \cos(xu\pi) dx \right\}$$
$$\cos(yu\pi) dy$$

$$\approx \sqrt{\frac{2}{M}} \sqrt{\frac{2}{N}} \sum_{g(u,v) \in Z} k_u k_v g(u, v) \int_c^d \cos(u\pi y) dy \int_a^b \cos(v\pi x) dx$$

where Z is the set of selected coefficients from zonal sampling.

Now, we generalize the above expression of integral to the k-dimensional case. Let $q_k$ be a k-dimensional range query. The range of the query $q_k$ is $a_i \leq x_i \leq b_i$ for $1 \leq i \leq k$. It is assumed that the data space is normalized as $(0,1)^n$. The $x_i$ coordinate is divided into $N_i$ partitions. Then the selectivity is expressed as follows:

Selectivity of a query (13)

$$q_k = \int_{a_k}^{b_k} \cdots \int_{a_2}^{b_2} \int_{a_1}^{b_1} f(x_1, x_2, \ldots, x_k) dx_1 dx_2 \ldots dx_k$$

$$\approx \sqrt{\frac{2}{N_1}} \cdots \sqrt{\frac{2}{N_k}} \sum_{g(u_1,\ldots,u_k) \in Z} k_{u_1} \ldots k_{u_k} g(u_1, \ldots u_k)$$

$$\int_{a_1}^{b_1} \cos(u_1 \pi x_1) dx \ldots \int_{a_k}^{b_k} \cos(u_k \pi x_k) dx_k$$

Figure 5:
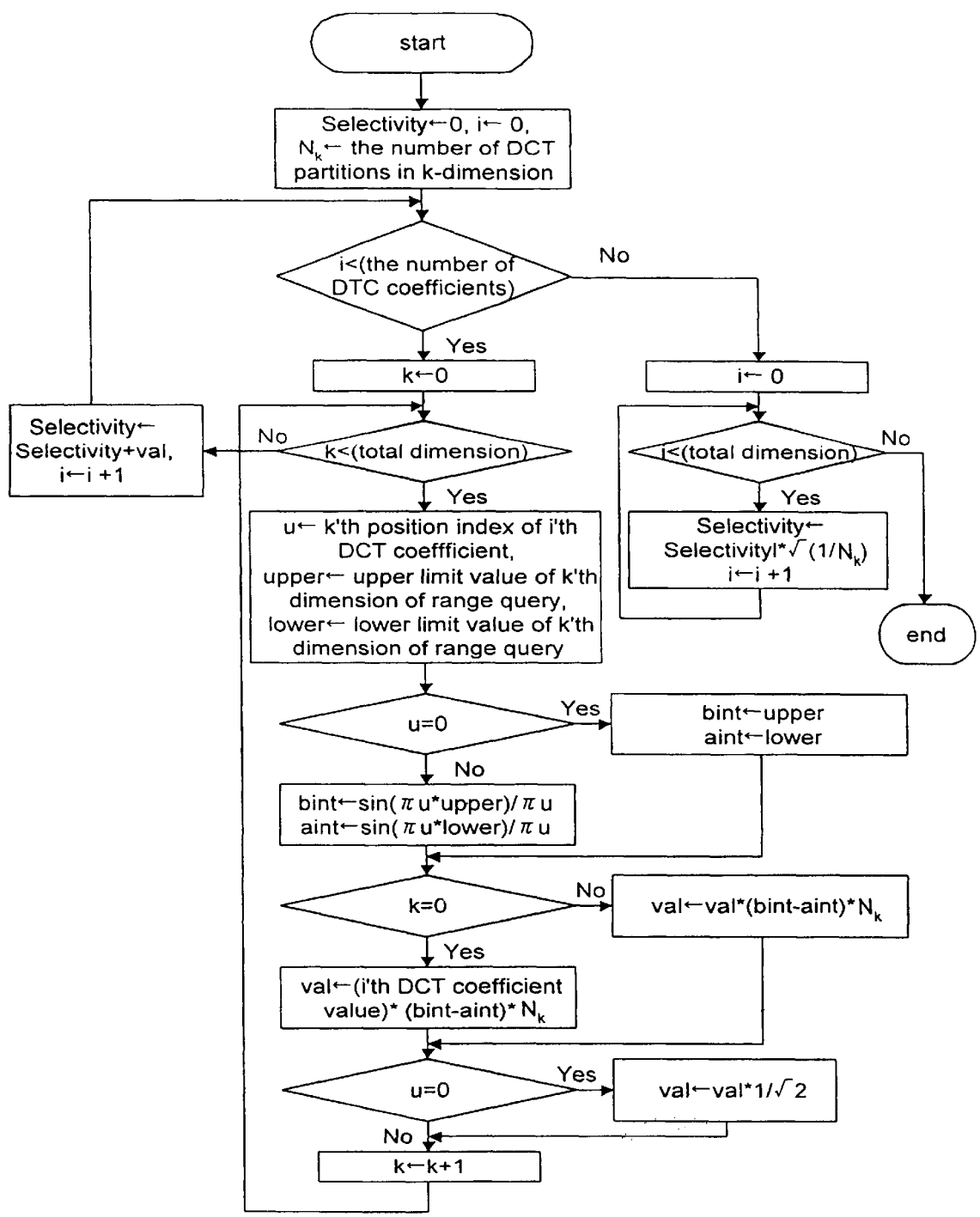
FIG. 5 is a flowchart illustrating a selectivity estimation method of range queries in k-dimensional case according to the present invention.

FIG. 5 is a flowchart illustrating a selectivity estimation method of range queries in k-dimensional case according to the present invention.

Figure 3:
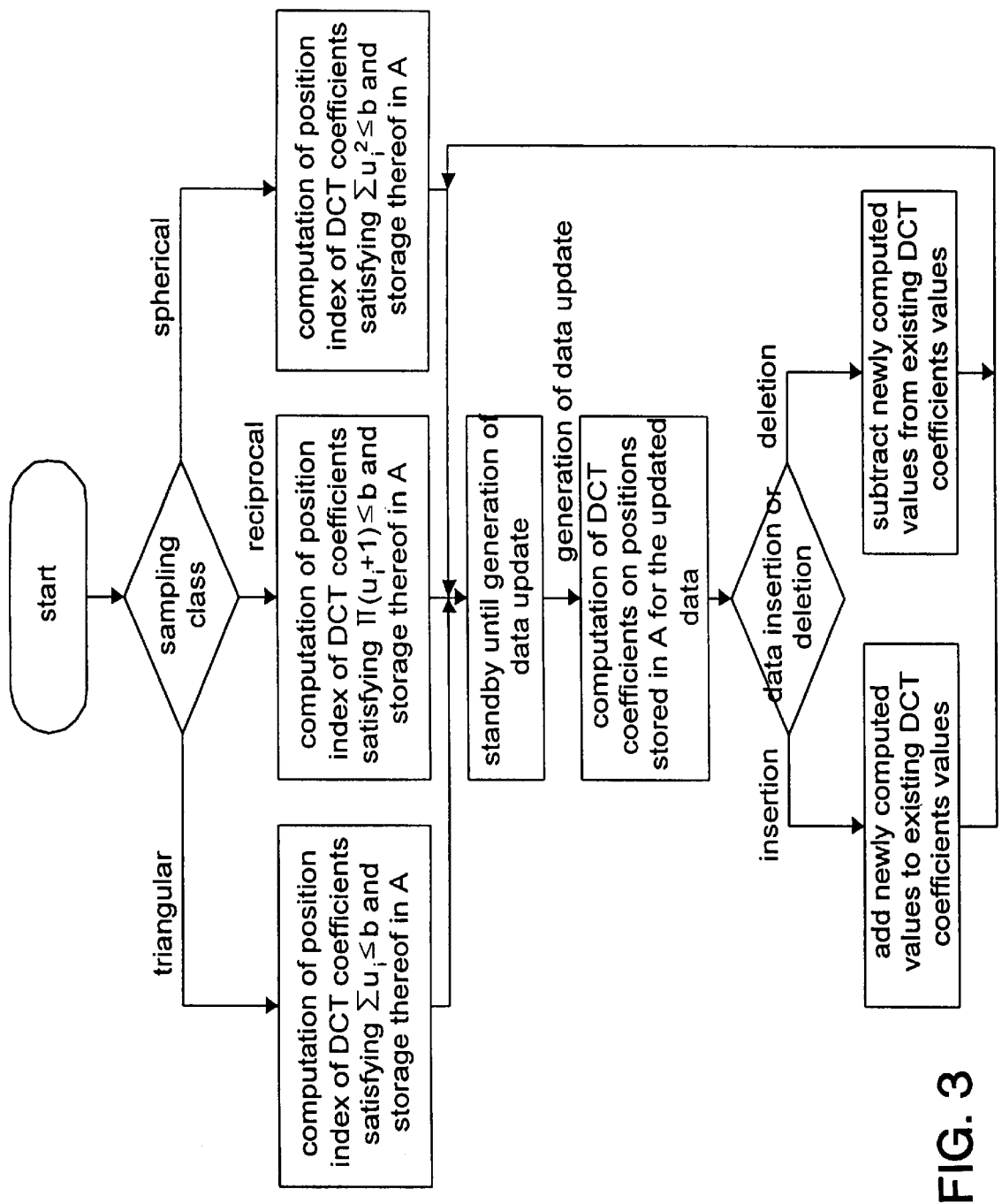
FIG. 3 is a flowchart illustrating generation and maintenance of a compressed histogram.

Meanwhile, the compressed histogram information as mentioned above is generated and maintained by the following two methods:

The first method is applied, as shown in FIG. 3, when the DCT coefficients are computed from the initial insertion of data. Firstly, inputs such as a sampling method, data space dimension, the number of partitions by each dimension, and the bound value b for sampling are given. Based upon the inputs, the corresponding sampling method is applied and the position indices of the sampled DCT coefficients are stored. The initial values of the DCT coefficients are set zero. Whenever the data is newly inserted or deleted, the DCT coefficients of the sampled position of the corresponding data are computed and added to the original DCT coefficients in case of data insertion or subtracted therefrom in case of data deletion.

Figure 4:
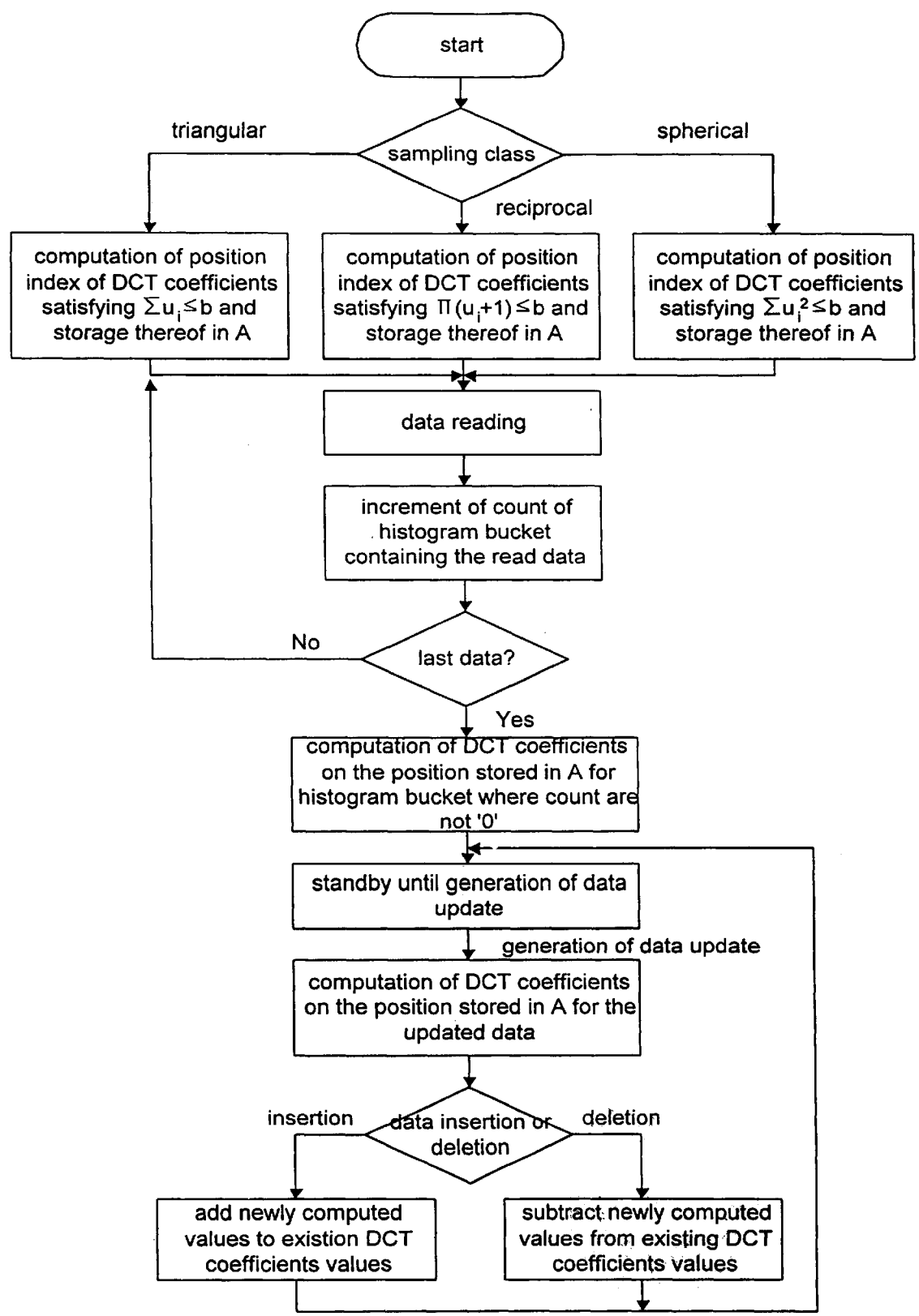
FIG. 4 is a flowchart illustrating generation and maintenance of a compressed histogram in case of having a large amount of data in an initial state.

The second method is applied, as shown in FIG. 4, when a large amount of data already exists. Firstly, inputs in the same manner as the first method are given. Based upon the inputs, the corresponding sampling method is applied and the position indices of the sampled DCT coefficients are stored. The initial values of the DCT coefficients are set zero. The number of data contained in the histogram bucket for each data are counted. Sampled DCT coefficients are computed for the histogram buckets count values with non-zero. Next, whenever the data is newly inserted or deleted, sampled DCT coefficients for new data are computed and added to the original DCT coefficients in case of data insertion or subtracted therefrom in case of data deletion.

In order to measure the accuracy of the proposed method of the present invention in estimating the result sizes of queries, comprehensive experiments are conducted over an environment containing various synthetic data distributions and various queries. All data are generated in the normalized data space $(0,1)^n$. Synthetic data are generated with 50K records which ranged from 2 to 10 dimensions. Data are generated with various distributions:

1. Normal distribution: The data points follow $N(0, \sigma^2)$ where $\sigma=0.4$ for 2~4 dimensions, $\sigma=1.0$ for 5~10 dimensions.

2. Zipf distribution: The data points follow the Zipf distribution where z=0.3 for 2~5 dimensions, z=0.2 for 6~10 dimensions. The Zipf distribution is defined as follows:

$$f(i) = \frac{\frac{1}{i^z}}{\frac{1}{1^z} + \frac{1}{2^z} + \ldots + \frac{1}{N^z}} \quad (14)$$

where i=1,2, . . . , N

3. Clustered distribution: 5~15 normal distributions are overlapped in a data distribution.

The selectivity estimation method proposed in the present invention is evaluated for range queries of the form $(a_1 \leq X_1 \leq b_1)$ & . . . & $(a_n \leq X_n \leq b_n)$, where $0 \leq a_i, b_i \leq 1$. Four sets of 30 queries were made such that each set represents a different range of selectivity: large($\approx$0.3), medium($\approx$0.067), small($\approx$0.0067), very small ($\approx$0.0013).

There are two query models for the probability distribution of queries [Reference: A. Belussi, C. Faloutsos. Estimating the Selectivity of Spatial Queries Using the 'Correlation' Fractal Dimension. VLDB Conference 1995]: the random model, the biased model. The random model assumes that queries are uniformly distributed in the data space. The biased model assumes that queries are more highly distributed in high-density regions. That is, each data is equally likely to be queried.

Most applications follow the latter model. For example, in GIS applications, users are not likely to query the area of a dessert but are likely to query populated areas like a city. In image database applications, most of users may browse the images from a database and pick up the most similar image that they want from the browsed images and search images similar to it. This means that queries are located more frequently in dense area in the data space. So, the biased model is adopted as a query model in these experiments. For each query, 30 biased queries are generated. The query results are compared with the estimations using the proposed method of the present invention. A percentage error is used for the accuracy of an estimation result, which is given as follows:

$$= \frac{|\text{query result size} - \text{estimated result size}|}{\text{query result size}} \times 100\% \quad (15)$$

The amount of the storage should be small and the computation time of selectivity should be short in order to be used for the query optimizer. In the present invention, the amount of the storage required of the statistics for estimating the selectivity is as follows: The amount of the storage for the present method is proportional to the number of DCT coefficients selected by zonal sampling. If the multi-dimensional index of a DCT coefficient is converted to an one-dimensional value and vice versa, one DCT coefficient needs 4 bytes for storing its value and 4 bytes for storing its index. 8 bytes are required for storing one DCT coefficient. If one use 100 DCT coefficients for estimating the selectivity, 800 bytes and some book keeping bytes are required.

From the selectivity calculation formula (13), the selectivity computation time can be estimated as follows: If k is the dimension and $\alpha$ is the time to compute the sine function, the time to compute the selectivity is given by $2*k*\alpha*$(the number of selected DCT coefficients). In Sun Ultra II, $\alpha$ is measured as about 1 sec. FIG. 6 shows a table illustrating the typical selectivity estimation time.

Figure 9:
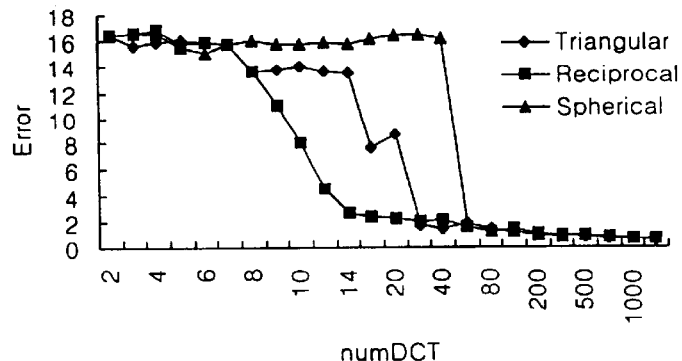
FIG. 9 is a graph showing error rates in case of clustered 15 distribution, dimension=6, and one-dimensional partition=10.

The performance of the geometrical zonal sampling is shown in FIGS. 7 to 9, respectively. The efficiency of the zonal sampling is affected by distributions. Experiments for 3 different distributions in the 6-dimension are made: (1) Normal distribution (2) Zipf distribution (3) Clustered 15 distribution (that has 15 clusters). The results show that the reciprocal zonal sampling is the best for all distributions. However, there are some threshold after which there is no difference between three zonal methods. Therefore, when a few DCT coefficients are used, the reciprocal zonal sampling is the best.

Figure 10:
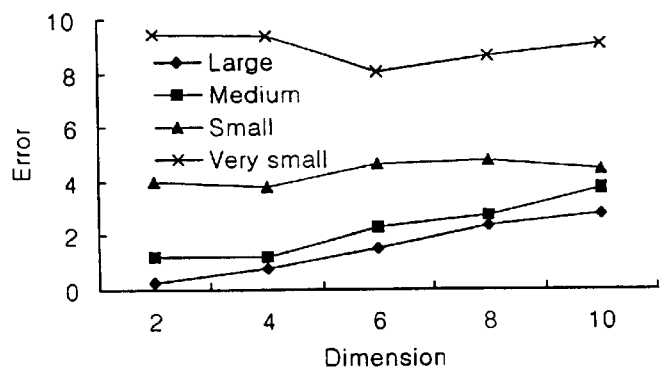
FIG. 10 is a graph showing error rates in case of clustered 15 distribution and the number of DCT coefficients=100.
Figure 11:
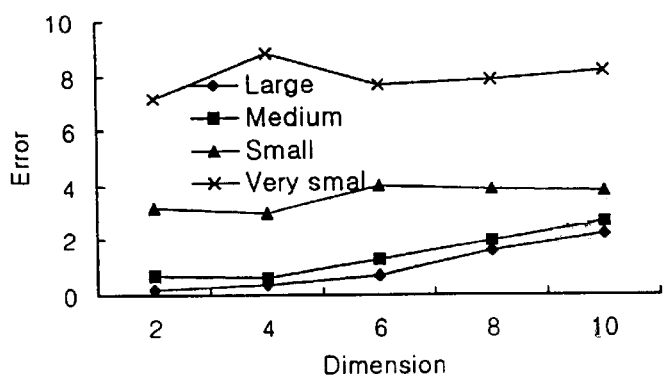
FIG. 11 is a graph showing error rates in case of clustered 15 distribution and the number of DCT coefficients=500.
Figure 12:
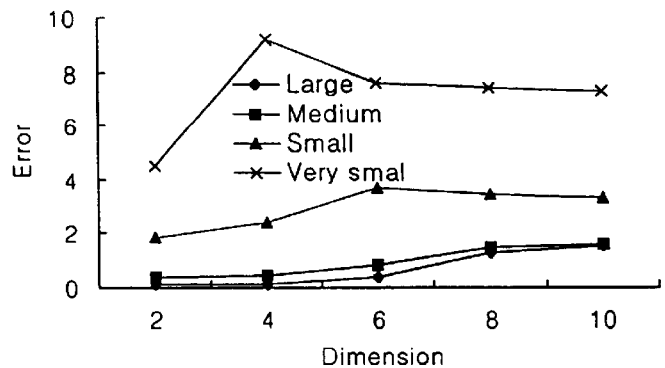
FIG. 12 is a graph showing error rates in case of clustered 15 distribution and the number of DCT coefficients=2000.

Accuracy of the selectivity estimation is affected by the dimension and query sizes. FIGS. 10 to 12 show error rates results of 4 query sizes in various dimensions. The data distribution is the clustered 15 distribution (15 normal distributions are overlapped) and the reciprocal zonal sampling method is used. As the dimension increases, the error rates increase slightly, but the average error of queries is below 10%. This results show that the method in the present invention can be used for up to 10-dimensional data spaces.

Figure 13:
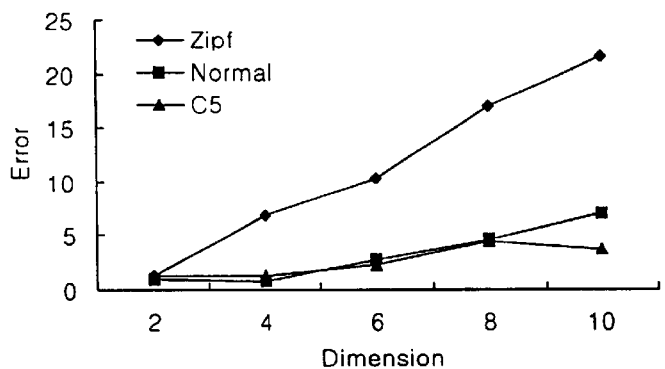
FIG. 13 is a graph showing error rates to dimension and distribution in case of the number of DCT coefficients=100.
Figure 14:
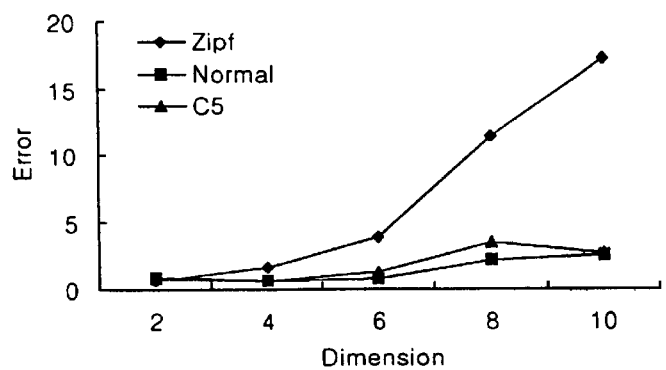
FIG. 14 is a graph showing error rates to dimension and distribution in case of the number of DCT coefficients=500.
Figure 15:
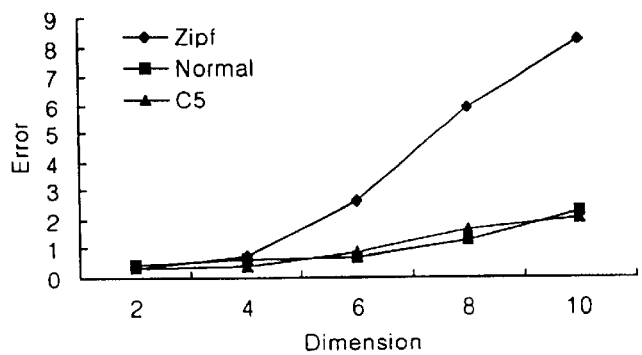
FIG. 15 is a graph showing error rates to dimension and distribution in case of the number of DCT coefficients=2000.
Figure 16:
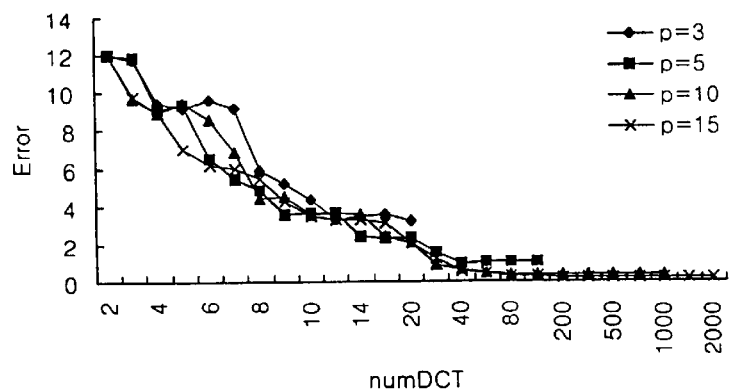
FIG. 16 is a graph showing error rates to space partition in case of dimension=3, query size=medium, and clustered 5 distribution.
Figure 17:
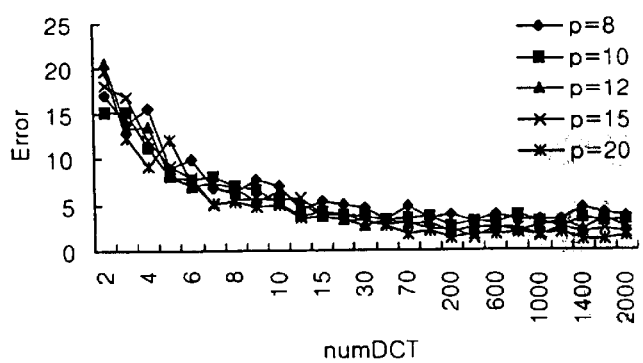
FIG. 17 is a graph showing error rates to space partition in case of dimension=5, query size=medium, and clustered 5 distribution.
Figure 18:
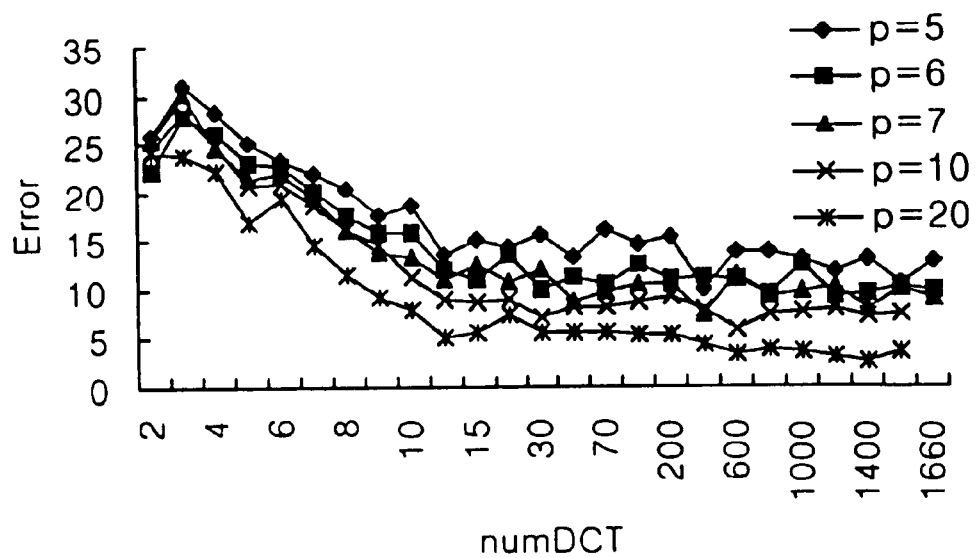
FIG. 18 is a graph showing error rates to space partition in case of dimension=7, query size=medium, and clustered 5 distribution.
Figure 19:
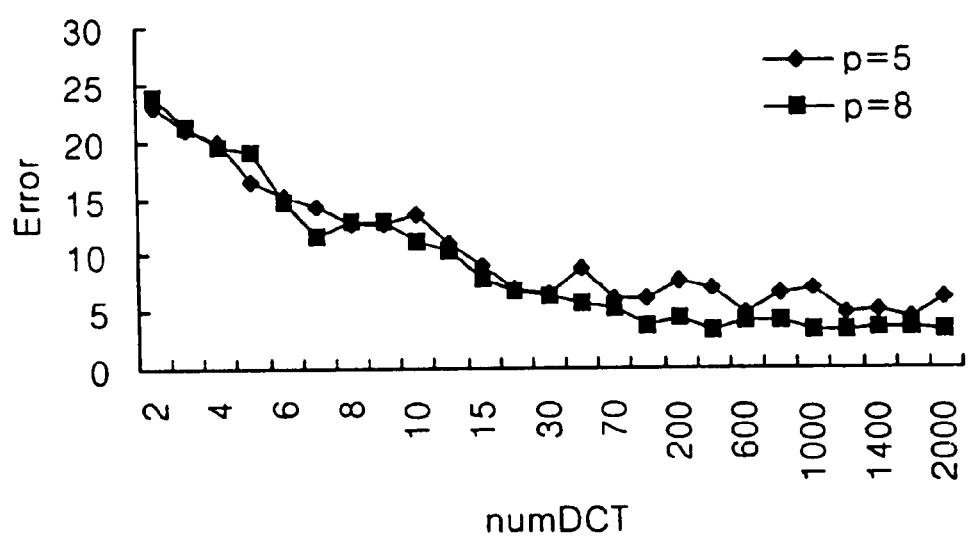
FIG. 19 is a graph showing error rates to space partition in case of dimension=10, query size=medium, and clustered 5 distribution.

The data distribution has impacts on the error rates for estimating the selectivity. FIGS. 13 to 15 show the experiment results related to the data distribution. The Zipf is a skewed distribution. As the dimension increase, the skewness of the Zipf also increase exponentially. The error rates of the normal and the clustered 5 distributions increase very slightly. This means that the skewness of the normal and the clustered distribution increases slightly as the dimension increases, compared with the skewness of the Zipf. Therefore, the experimental results show that the more high the skewness is, the more the error rates increase. However, as expected, it is verified the fact that the more we use the DCT coefficients, the more accurate the results are. In addition, since the clustered distribution is the most common phenomenon in many applications, the proposed method of the present invention can be widely used in real world.

The error rates of the selectivity estimation is affected by a multi-dimensional space partition. FIGS. 16 to 19 show the experiment results related to the multi-dimensional space partition. Each dimension of a multi-dimensional space is partitioned into p partitions. The values of the selected DCT coefficients are sorted in the descending order and then experimented. As the number of partitions (p) increases, the accuracy also increase. The more DCT coefficients we use for estimating the selectivity, the more accurate the result is.

As clearly discussed above, a multi-dimensional selectivity estimation method using compressed histogram information according to the present invention can increase accuracy of the selectivity estimation of the queries including several attributes, if applied in a database query optimizer, to thereby allow the query optimizer to find a more accurate user query execution plan. In addition, the proposed method of the present invention has the advantage of eliminating the overload for periodical reconstructions of the statistics for the selectivity estimation in the environment where data is updated frequently.

It will be apparent to those skilled in the art that various modifications and variations can be made in a multi-dimensional selectivity estimation method using compressed histogram information of the present invention without departing from the spirit or scope of the invention. Thus, it is intended that the present invention cover the modifications and variations of this invention provided they come within the scope of the appended claims and their equivalents.

What is claimed is:

1. A multi-dimensional selectivity estimation method using compressed histogram information to obtain the statistics approximating data distribution of a database for the estimation of database query selectivity, said method comprising the steps of:

dividing the data distribution to generate a large number of small-sized multi-dimensional histogram buckets;

compressing the histogram information from the multi-dimensional histogram buckets using a multi-dimensional discrete cosine transform(DCT) and storing the compressed information; and estimating the query selectivity by using the compressed and stored histogram information as the statistics.

2. The method of claim 1, wherein said histogram compressing step by using said multi-dimensional DCT uses, upon a geometrical zonal sampling in which DCT coefficients having large values among DCT coefficients are selected to reduce the amount of stored information, after the DCT, a triangular sampling method which selects the DCT coefficients, such that the sum of position indices is less than or equal to a given sampling bound value.

3. The method of claim 1, wherein said histogram compressing step by using said multi-dimensional DCT uses, upon a geometrical zonal sampling in which DCT coefficients having large values among DCT coefficients are selected to reduce the amount of stored information, after the DCT, a reciprocal sampling method which selects the DCT coefficients, such that the multiplication of position indices to which '1' is added is less than or equal to a given sampling bound value.

4. The method of claim 1, wherein said histogram compressing step by using said multi-dimensional DCT uses, upon a geometrical zonal sampling in which DCT coefficients having large values among DCT coefficients are selected to reduce the amount of stored information, after the DCT, a spherical sampling method which selects the DCT coefficients, such that the sum of the square of position indices is less than or equal to a given sampling bound value.

5. The method of claim 1, wherein upon application of said DCT, if data are newly inserted, the DCT coefficients of the inserted data are computed and added to existing DCT coefficients, and if data are deleted, the DCT coefficients of the deleted data are computed and subtracted from the existing DCT coefficients, to thereby reflect dynamic data updates to the statistics for estimating the query selectivity immediately in the environment where the data are frequently inserted or deleted.

6. The method of claim 1, wherein in said estimating step, assuming that $q_k$ is a k-dimensional range query, the range of the query $q_k$ is $a_i \leq x_i \leq b_i$ for $1 \leq i \leq k$, the data space is normalized as $(0,1)^n$, and the $x_i$ coordinate is divided into $N_i$ partitions, the selectivity of a query $q_k$ is expressed as follows:

Selectivity of a query (13)

$$q_k = \int_{a_k}^{b_k} \cdots \int_{a_2}^{b_2} \int_{a_1}^{b_1} f(x_1, x_2, \ldots, x_k) dx_1 dx_2 \ldots dx_k$$

$$\approx \sqrt{\frac{2}{N_1}} \cdots \sqrt{\frac{2}{N_k}} \sum_{g(u_1,\ldots,u_k) \in Z} k_{u_1} \ldots k_{u_k} g(u_1, \ldots u_k)$$

$$\int_{a_1}^{b_1} \cos(u_1 \pi x_1) dx \ldots \int_{a_k}^{b_k} \cos(u_k \pi x_k) dx_k.$$

\* \* \* \* \*